United States Patent
Patenaude

(10) Patent No.: US 7,254,398 B2
(45) Date of Patent: Aug. 7, 2007

(54) DYNAMIC CONNECTION RETRY STRATEGY FOR TELEMATICS UNIT

(75) Inventor: Russell A. Patenaude, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 93 days.

(21) Appl. No.: 11/017,391

(22) Filed: Dec. 20, 2004

(65) Prior Publication Data

US 2006/0135170 A1   Jun. 22, 2006

(51) Int. Cl.
   *H04Q 7/20* (2006.01)
(52) U.S. Cl. ............ 455/450; 455/410; 455/411; 455/423
(58) Field of Classification Search ............ None
   See application file for complete search history.

(56) References Cited

U.S. PATENT DOCUMENTS

| | | | | |
|---|---|---|---|---|
| 5,337,345 A | * | 8/1994 | Cassidy et al. | 455/410 |
| 2006/0079219 A1 | * | 4/2006 | Nicolini | 455/423 |

* cited by examiner

*Primary Examiner*—Erika A. Gary

(57) ABSTRACT

A method for providing wireless connection capability for a telematics unit including determining a connection failure between the telematics unit and a call center, providing the telematics unit with an alternative cellular identifier pair at the telematics unit based on the determination and attempting to establish a connection between the telematics unit and the call center using the alternative cellular identifier pair.

20 Claims, 5 Drawing Sheets

DYNAMIC CONNECTION RETRY STRATEGY FOR TELEMATICS UNIT

FIELD OF THE INVENTION

This invention relates generally to a strategy to retry connecting a telematics unit to a call center. In particular, the invention relates to dynamically reprogramming a network access device to retry connecting to a call center.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers establish a voice or data communication channel between a telematics unit and the call center to provide various types of location services, including sending emergency help to a vehicle when air bags deploy, stolen vehicle tracking, traffic information, weather reports, road condition information, accident updates, street routing, and business finders.

When a user attempts to establish a non-emergency communication channel between the telematics unit and the call center, the service provider opens the communication channel after the transmitted mobile identification number (MIN) and electronic serial number (ESN) are recognized as an authorized MIN/ESN pair. The initial call attempts to establish a data connection from the telematics unit to the call center, sending information such as the location of the vehicle and vehicle identification. If the attempt to open the communication channel fails the telematics unit automatically makes one or more attempts to open the non-emergency communication channel over normal cellular communication channels using the same MIN/ESN pair. If one or more additional attempts fail, the telematics unit informs the user that the call attempt has failed. An additional attempt is made using a voice only connection rather than a data connection. However, even the voice connection is subject to some failures.

The telematics unit continues indefinitely to establish an emergency communication channel between the telematics unit and the call center. In this case, additional call attempts are made followed by a non-authenticated voice call attempt. Non-authenticated voice calls, also known in the art as cleared calls, are comprised of predetermined phone numbers that are not checked by the carrier or network for validity. All the attempts to place the call are made over normal cellular communication channels using the same MIN/ESN pair.

It is desirable to reprogram the network access device to use additional technologies and previously assigned and/or alternative cellular parameters to establish the communication channel between the telematics unit and the call center in the event that an attempt to establish a communication channel between the telematics unit and the call center fails.

SUMMARY OF THE INVENTION

One aspect of the present invention provides a method for providing wireless connection capability for a telematics unit including determining a connection failure between the telematics unit and a call center, providing the telematics unit with an alternative cellular identifier pair at the telematics unit based on the determination and attempting to establish a connection between the telematics unit and the call center using the alternative cellular identifier pair.

A second aspect of the present invention provides a system for providing wireless connection capability for a telematics unit including means for determining a connection failure between the telematics unit and a call center, means for providing the telematics unit with an alternative cellular identifier pair including an alternative mobile identification number at the telematics unit based on the determination, and means for attempting to establish a connection between the telematics unit and the call center using the alternative cellular identifier pair.

A third aspect of the present invention provides computer readable medium storing a computer program including computer readable code operable for determining a connection failure between the telematics unit and a call center, computer readable code for providing the telematics unit with an alternative cellular identifier pair including an alternative mobile identification number at the telematics unit based on the determination and computer readable code for attempting to establish a connection between the telematics unit and the call center using the alternative cellular identifier pair.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
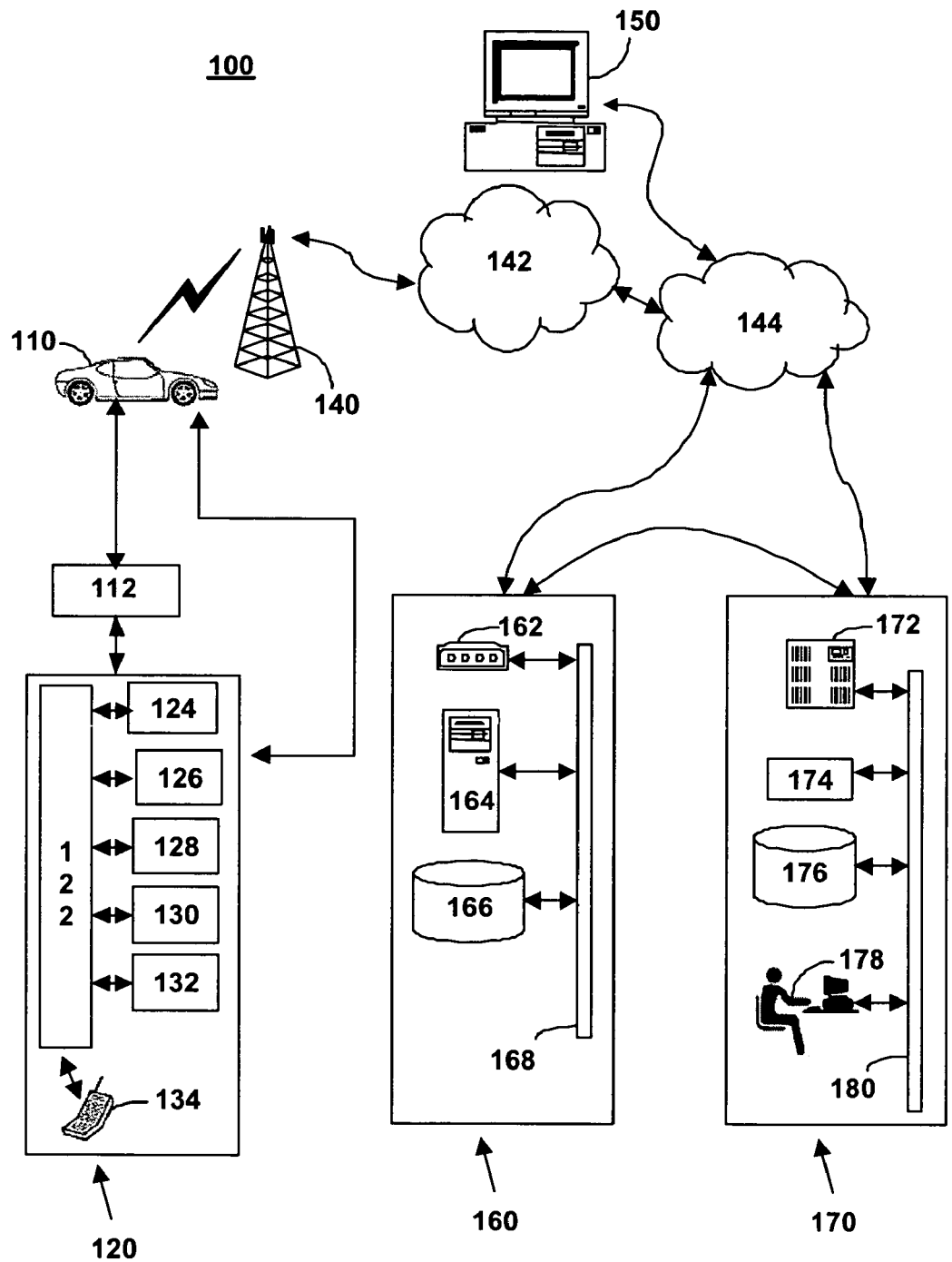
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and a network access device 134 such as an embedded or in-vehicle mobile phone. In other embodiments, telematics unit 120 may be implemented without one or more of the above listed components, such as, for example, a microphone 130 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). Network access device 134 is a cellular-type communication device, such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
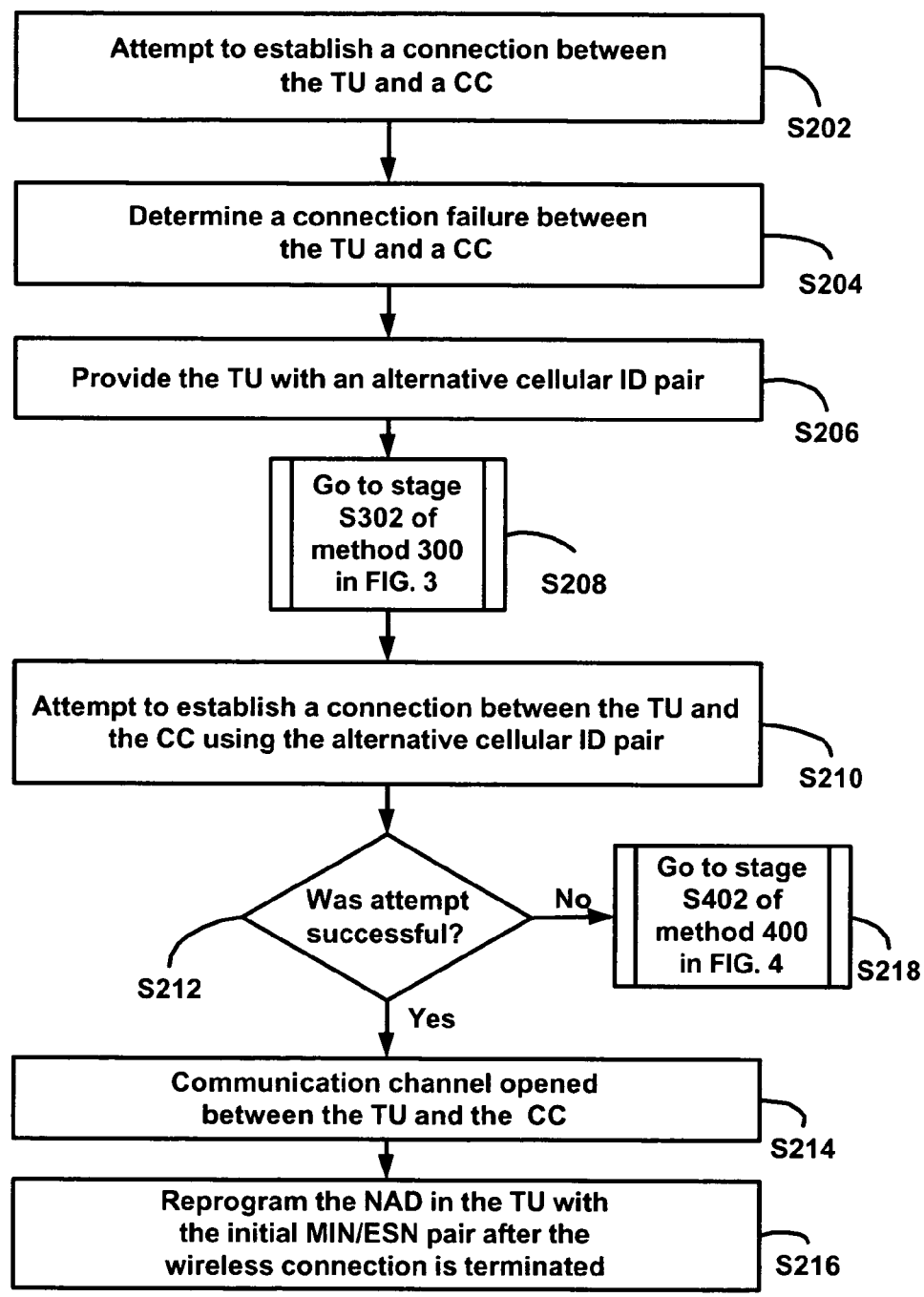
FIG. 2 illustrates a method representative of a first portion of a method of providing a wireless connection in accordance with the present invention.

The methods 200, 300, 400 and 500 described with reference to FIGS. 2-5, respectively, together form a complete method for providing a wireless connection capability for a telematics unit 120 in an MVCU 110, if the initial attempts for a wireless connection fail. FIG. 2 illustrates a method 200 representative of the first portion of a method of providing a wireless connection in accordance with the present invention. The telematics unit 120, the processor 122, and the network access device 134, such as an embedded or in-vehicle mobile phone, have stored in computer readable medium at least one computer program including computer readable code to perform the operations described with reference to method 200.

During stage S202, the telematics unit (TU) 120 attempts to establish a wireless connection between the telematics unit 120 and the call center (CC) 170 using standard telematics procedures. The wireless connection can be made over one or more wireless carrier systems 140, one or more communication networks 142, one or more land networks 144, one or more client, personal or user computers 150, one or more web-hosting portals 160, and/or one or more call centers 170. The network access device 134 has an assigned mobile identification number and an electronic serial number, which together are referred to as an initial MIN/ESN pair. The electronic serial number is unique to the network access device 134 and is never changed.

The MIN/ESN pair is included in the control channel information for voice or data calls and is used to authenticate the calls made from the network access device 134. The service providers use the MIN/ESN pair to prevent cloning of network access devices 134.

If the service provider in the wireless carrier system 140 does not recognize the MIN and ESN as an authorized MIN/ESN pair, the network access device 134 is flagged as having a fraudulent MIN/ESN pair and the call is not completed. It can happen that a network access device 134 used to establish a wireless connection is incorrectly flagged as having a fraudulent MIN/ESN, if the service provider has the incorrect MIN number for a given ESN.

When the service provider for the telematics unit 120 recognizes the MIN/ESN, an acknowledgement is transmitted from the service provider to the telematics unit 120. The telematics unit 120 receives the acknowledgement and recognizes that the wireless connection is established for a data session and/or voice session.

During stage S204, the telematics unit 120 determines a connection failure between the telematics unit (TU) 120 and the call center (CC) 120. This occurs when the service provider for the telematics unit 120 does not recognize the authenticity of the MIN/ESN, therefore, no acknowledgement is sent to the telematics unit 120. If an acknowledgement is not received within a predetermined time, the telematics unit 120 determines, from the lack of received acknowledgement, that the wireless connection is not established for a data session and/or voice session with the call center 170.

There are other possible reasons for a failed connection between the telematics unit 120 and the call center 170. A physical break in a segment of the connection between the telematics unit 120 and the call center 170 results in a connection failure. A computer failure in one of the wireless carrier systems 140, the communication networks 142, the land networks 144, the client, personal or user computers 150, the web-hosting portals 160, and/or the call centers 170 providing the connection results in a connection failure. In any of these connection failure modes, the telematics unit 120 does not receive an acknowledgement of a connection.

During stage S206, the telematics unit (TU) 120 is provided with an alternative cellular identifier (ID) pair based on the determination of a connection failure during stage S204. The alternative cellular identifier pair is an alternative MIN/ESN pair that is recognizable by the service carrier. The alternative MIN/ESN pair includes the electronic serial number of the network access device 134 and an alternative MIN that is stored in the in-vehicle memory 128 of the telematics unit 120.

When the service provider receives control channel information including an alternative cellular identifier pair, the call is transmitted to the call center 170. The alternative cellular identifier pair is a MIN/ESN that was previously provisioned in the telematics unit 120.

In one embodiment, the alternative MIN is the factory installed MIN that was encoded in telematics unit 120 at the factory, which manufactured the MVCU 110. When the user of the MVCU 110 enrolls in the MVCS 100, the standard MIN is assigned to the network access device 134. Then, the factory installed alternative MIN may be quarantined for a predetermined period and cannot be reused in any other network access device until the quarantine is over. In one embodiment, the predetermined quarantine period is ninety (90) days. In another embodiment, the predetermined quarantine period is unlimited.

Figure 3:
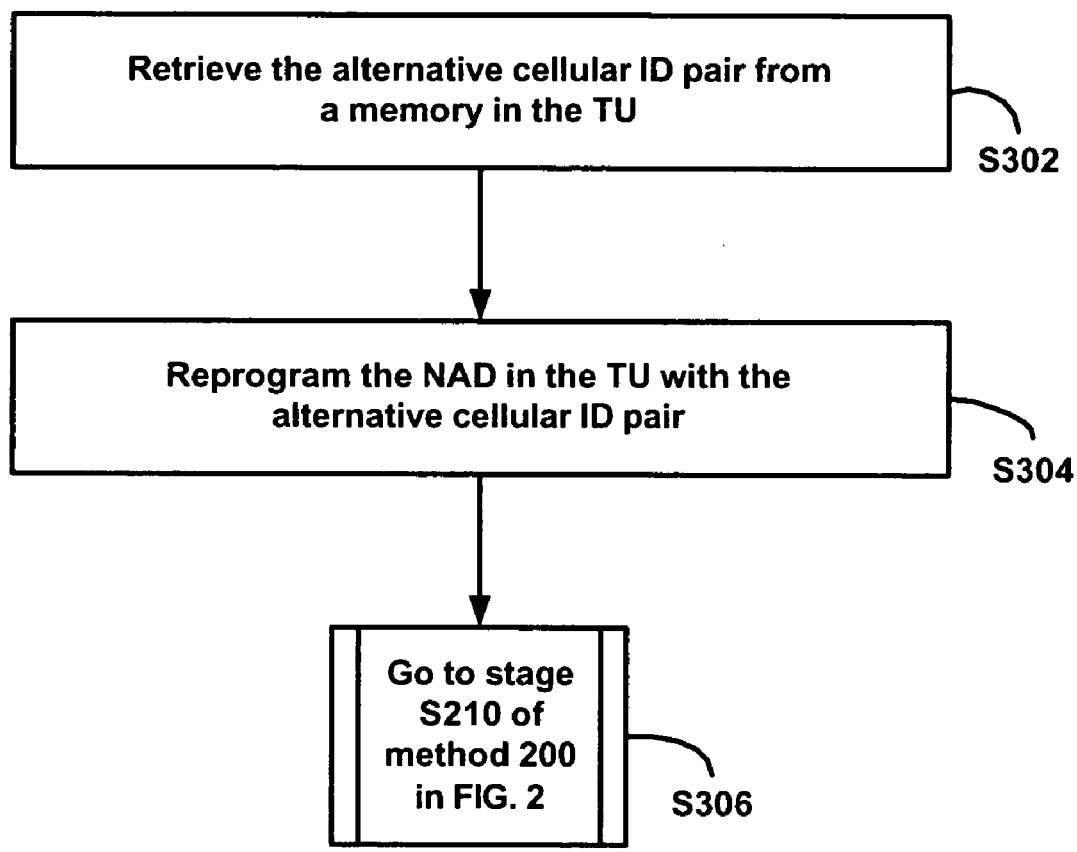
FIG. 3 illustrates a method representative of a second portion of a method of providing a wireless connection in accordance with the present invention.

During stage S208, the method 200 is directed to stage S302 of method 300 in FIG. 3. The method 300 is described at this point to provide continuity to the flow of the complete method for providing wireless connection capability for a telematics unit 120, which includes the methods 200, 300, 400 and 500.

FIG. 3 illustrates a method 300 representative of a second portion of the method of providing a wireless connection in accordance with the present invention. The telematics unit 120, the processor 122, and the network access device 134 have stored in computer readable medium at least one computer program including computer readable code to perform the operations described with reference to method 300. The second portion of the method of providing a wireless connection includes a detailed description of how the telematics unit 120 is provided with the alternative cellular identifier pair.

During stage S302, the telematics unit 120 determines the connection failure and retrieves the alternative cellular identifier (ID) pair from the in-vehicle memory 128 in the telematics unit (TU) 120. The processor 122 retrieves the alternative MIN and the electronic serial number of the network access device 134 from the in-vehicle memory 128 and combines them to form the alternative cellular identifier pair. In one embodiment, the processor 122 retrieves the initial MIN/ESN pair and the alternative MIN from the in-vehicle memory 128, strips the MIN from the initial MIN/ESN pair to obtain the electronic serial number of the network access device 134 and combines the alternative MIN with the electronic serial number to form the alternative cellular identifier pair.

During stage S304, the telematics unit (TU) 120 reprograms the network access device (NAD) 134 in the telematics unit 120 with the alternative cellular identifier pair. The processor 122 reprograms a programmable chip in the network access device 134 so that when the network access device 134 initiates a wireless connection, the control channel information includes the alternative cellular identifier pair.

During stage S306, the method 300 is directed to stage S210 of method 200 in FIG. 2. The remainder of method 200 is described at this point to provide continuity to the flow of the complete method for providing wireless connection capability for a telematics unit 120.

During stage S210, the telematics unit (TU) 120 attempts to establish a connection between the telematics unit 120 and the call center (CC) 170 using the alternative cellular identifier (ID) pair that is now embedded in the network access device 134. The attempt to establish a connection between the telematics unit 120 and the call center 170 using the alternative cellular identifier pair is an attempt to establish a non-authenticated call wireless connection between the telematics unit 120 and the call center 170.

The wireless connection can be made over one or more wireless carrier systems 140, one or more communication networks 142, one or more land networks 144, one or more client, personal or user computers 150, one or more web-hosting portals 160, and/or one or more call centers 170.

During stage S212, it is determined if the attempt was successful. The attempt to establish a connection between the telematics unit 120 and the call center 170 was successful if the telematics unit 120 receives an acknowledgement from the service provider as described above with reference to stage S202. The processor 122 receives and recognizes the acknowledgement.

If it is determined, during stage S212, that the attempt was successful the method 200 is directed to stage S214. During stage S214, a communication channel is opened between the telematics unit (TU) 120 and the call center (CC) 120. During stage S216, the telematics unit (TU) 120 reprograms the network access device (NAD) 134 in the telematics unit 120 with the initial MIN/ESN pair described above with reference to stage S202 after the wireless connection is terminated. When the wireless connection is terminated the telematics unit 120 receives a termination signal. The processor 122 receives and recognizes the termination signal and reprograms the programmable chip in the network access device 134 with the initial MIN/ESN pair. When the network access device 134 initiates the next wireless connection, the control channel information will include the initial MIN/ESN pair.

If it is determined, during stage S212, that the attempt was not successful the method 200 is directed to stage S218. During stage S218, the method 200 is directed to stage S402 of method 400 in FIG. 4.

Figure 4:
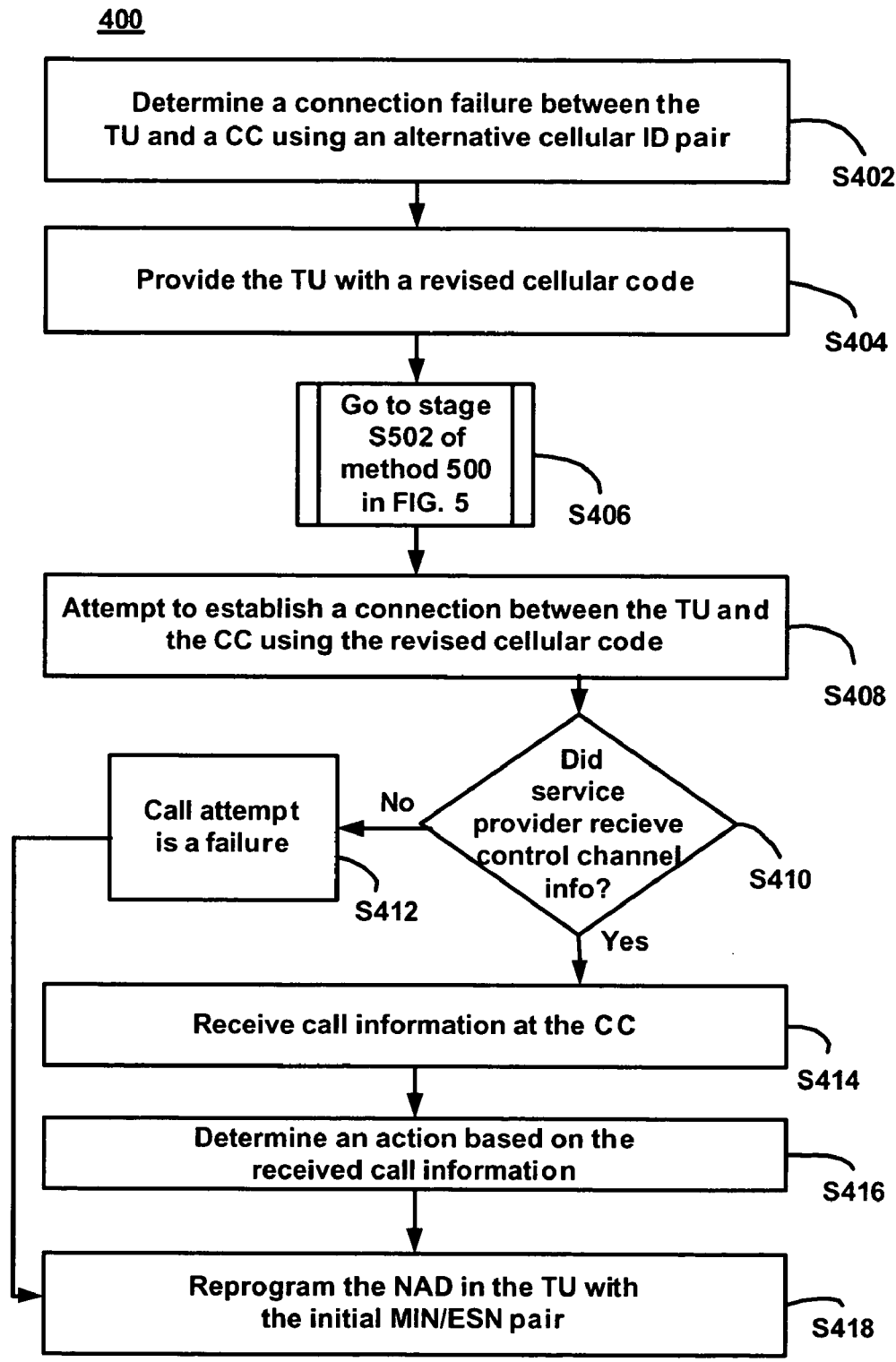
FIG. 4 illustrates a method representative of a third portion of a method of providing a wireless connection in accordance with the present invention.

FIG. 4 illustrates a method 400 representative of a third portion of a method of providing a wireless connection in accordance with the present invention. The telematics unit 120, the processor 122, and the network access device 134 have stored in computer readable medium at least one computer program including computer readable code to perform the operations described with reference to method 400. The third portion of the method includes a detailed description of how the telematics unit 120 responds when the alternative cellular identifier pair does not provide a wireless connection.

During stage S402, the telematics unit (TU) 120 determines a connection failure between the telematics unit 120 and a call center (CC) 170 using the alternative cellular identifier (ID) pair. Since the service provider for the telematics unit 120 does not authenticate the alternative cellular identifier pair some other problem other than authentication caused the connection failure. Problems that cause connection failure include a physical break in the connection path or a computer failure at any point in the connection path as described above with reference to stage S204 of method 200. The telematics unit 120 determines, from the lack of received acknowledgement, that the wireless connection is not established for a data session or a voice session with the call center 170.

During stage S404, the telematics unit 120 is provided with a revised cellular code based on the determination of stage S402. The revised cellular code includes a revised mobile identification number (MIN) and the electronic serial number (ESN) for a network access device, which form a revised cellular identification pair. The revised MIN/ESN pair may be used with an alternative wireless communication technology with encoded control channel data including, customer specific data, call specific data, vehicle location data or combinations thereof. The electronic serial number of the network access device 134, the revised MIN and the customer specific information are stored in the in-vehicle memory 128 of the telematics unit 120. The processor 122 determines the call specific information, and vehicle location information when the call is initiated. Call specific information identifies the reason for the call initiation, such as, air bag deployment, driving directions, vehicle theft, or collision detection.

Figure 5:
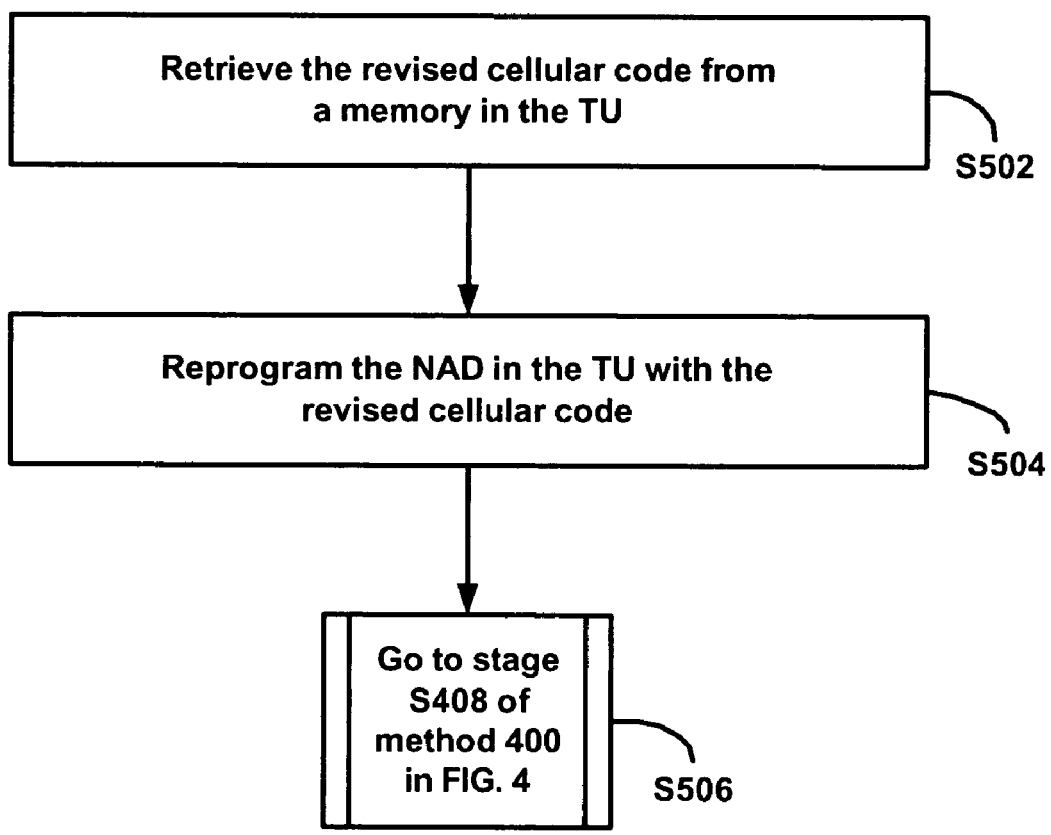
FIG. 5 illustrates a method representative of a fourth portion of a method of providing a wireless connection in accordance with the present invention.

During stage S406, the method 400 is directed to stage S502 of method 500 in FIG. 5. FIG. 5 illustrates a method representative of a fourth portion of a method of providing a wireless connection in accordance with the present invention. The telematics unit 120, the processor 122, and the network access device 134 have stored in computer readable medium at least one computer program including computer readable code to perform the operations described with reference to method 500. The fourth portion of the method of providing a wireless connection includes a detailed description of how the telematics unit 120 is provided with the revised cellular code.

During stage S502, the processor 122 in the telematics unit 120 retrieves the revised cellular code from the in-vehicle memory 128 in the telematics unit (TU) 120. The processor 122 retrieves the customer specific information from in-vehicle memory 128 and encodes the control channel information with the retrieved customer specific information, the call specific information and vehicle location information. The processor 122 retrieves the revised MIN and the electronic serial number of the network access device 134 from the in-vehicle memory 128, and combines them to form the revised cellular identification pair. Then the processor 122 forms the revised cellular code from the revised cellular identification pair (i.e., the revised MIN/ESN pair) and the encoded control channel information.

In one embodiment, the processor 122 retrieves the revised MIN from the in-vehicle memory 128 and strips the alternative MIN from the alternative cellular identification pair to obtain the electronic serial number of the network access device 134.

During stage S504, the telematics unit 120 reprograms the network access device (NAD) 134 in the telematics unit (TU) 120 with the revised cellular code (i.e., revised MIN/ESN pair). The processor 122 reprograms a programmable chip in the network access device 134 to modify the control channel information when the network access device 134 initiates a wireless connection. The modified control channel information will include the revised MIN/ESN pair and additional encoded information in a data packet and/or data packet header. During stage S506, the method 500 is directed to stage S408 of method 400 in FIG. 4.

During stage S408, the telematics unit (TU) 120 attempts to establish a connection between the telematics unit 120 and the call center (CC) 170 using the revised cellular code that is now embedded in the network access device 134. The attempt to establish a connection between the telematics unit 120 and the call center 170 using the revised cellular code is an attempt to establish a wireless connection between the telematics unit 120 and the call center 170 using an alternative technology.

During stage S410, the telematics unit 120 determines if the service provider received the data packet in the attempt to establish the connection between the telematics unit 120 and the call center (CC) 170 using the revised MIN/ESN map. When a network access device 134 transmits the encoded control channel information within the revised cellular code, the service provider reads the encoded control channel information, such as the home location register and rejects the call based on the MIN/ESN pair. A negative acknowledgement is sent to the telematics unit 120 from the service provider. If the telematics unit 120 does not receive the negative acknowledgement, the flow proceeds to stage S412. During stage S412, the telematics unit 120 determines the attempt to transmit information to the call center 170 was unsuccessful and the call attempt fails. The flow proceeds to stage S418. During stage S418, the telematics unit 120 reprograms the network access device (NAD) 134 in the telematics unit (TU) 120 with the initial MIN/ESN pair after a predetermined amount of time elapses without a negative acknowledgement being received at the telematics unit 120. The predetermined amount of time is stored within in-vehicle memory 128 and is retrieved by the processor 122.

The telematics unit 120 determines that an alternative technology is being used by the service provider to transmit call information to the call center 170, if the telematics unit 120 does receive the negative acknowledgement in response to the attempt to establish a connection between the telematics unit 120 and the call center (CC) 170 using the revised cellular code.

The alternative technology prompts the service provider to respond to the header data. Based on the header data, the service provider determines that call information is encoded in the control channel information. The service provider transmits the call information encoded in the control channel information to the call center 170 via the Internet. In one embodiment, the service provider transmits the control channel information to the call center 170 via the Internet and the call center 170 decodes the call information encoded in the control channel information. The call information includes customer specific information, call specific information, and vehicle location information.

In some embodiments, the service provider transmits the customer specific information, call specific information, and vehicle location information or the control channel information to the call center 170 via a back end connection including one or more wireless carrier systems 140, one or more communication networks 142, one or more land networks 144, one or more client, personal or user computers 150, one or more web-hosting portals 160.

During stage S414, the call center (CC) 170 receives the call information. During stage S416, the call center 170 determines an action based on the received call information. The determined action can be sending at least one emergency vehicle to the MVCU 110 location. Such an action is taken in response to the vehicle location information and call specific information that indicates the MVCU 110 was in an accident. For example, if the call specific information indicates the call was initiated in response to air bag deployment or collision detection, the communication services advisor 184 requests dispatch of an emergency vehicle to the location of the MVCU 110. In one embodiment, the communication services advisor 184 also calls the telematics unit 120 of the MVCU 110 to inform the user that an emergency vehicle has been dispatched.

Other actions include placing a call from the call center 170 to the telematics unit 120, placing a call to a residence of the subscriber, and/or sending an email to the subscriber using the customer specific information to determine the user. The user specific information can be a subscriber identification number. The communication services advisor 184 uses the subscriber identification number to retrieve a phone number, resident address and/or an email address from one or more communication services databases 176. Another action is reporting theft of the MVCU 110 to a law enforcement agency if the call specific information indicates a theft of the MVCU 110 has occurred. In one embodiment, the call center 170 transmits a notification of the action that was taken to the telematics unit 120.

During stage S418, the telematics unit (TU) 120 reprograms the network access device (NAD) 134 in the telematics unit 120 with the initial MIN/ESN pair after the wireless connection is terminated.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for providing wireless connection capability for a telematics unit comprising:
   determining a connection failure between the telematics unit and a call center;
   retrieving an alternative cellular identifier pair from a memory in the telematics unit based on the determination; and
   attempting to establish a connection between the telematics unit and the call center using the alternative cellular identifier pair.

2. The method of claim 1, wherein the attempt to establish a connection between the telematics unit and the call center using the alternative cellular identifier pair is an attempt to establish a non-authenticated call wireless connection between the telematics unit and the call center.

3. The method of claim 1, further comprising: attempting to establish a connection between the telematics unit and the call center using standard telematics procedures.

4. The method of claim 1, wherein retrieving the alternative cellular identifier pair from a memory in the telematics unit based on the determination comprises:
   reprogramming a network access device in the telematics unit with the alternative cellular identifier pair.

5. The method of claim 1, wherein the alternative cellular identifier pair comprises an alternative mobile identification number and an electronic serial number for a network access device.

6. The method of claim 1, further comprising: determining a connection failure between the telematics unit and the call center using the alternative cellular identifier pair; providing the telematics unit with a revised cellular code at the telematics unit based on the determination of a connection failure between the telematics unit and the call center using the alternative cellular identifier pair; and attempting to establish a A connection between the telematics unit and the call center using the revised cellular code.

7. The method of claim 6, wherein providing the telematics unit with a revised cellular code at the telematics unit based on the determination comprises: retrieving the revised cellular code from a memory in the telematics unit; and reprogramming a network access device in the telematics unit with the revised cellular code.

8. The method of claim 6, wherein the revised cellular code comprises an electronic serial number and a revised mobile identification number for a network access device.

9. The method of claim 8 wherein the revised cellular code further comprises a control channel information including encoded call information.

10. The method of claim 6, farther comprising: receiving call information at the call center responsive to the attempt to establish a connection between the telematics unit and the call center using the revised cellular code; and determining an action based on the received call information.

11. The method of claim 10, wherein the received call information is selected from the group consisting of customer specific information, call specific information, vehicle location information and combinations thereof.

12. The method of claim 10, wherein the determined action is selected from the group consisting of sending at least one emergency vehicle to a vehicle location, placing a call from the call center to the telematics unit, placing a call to a residence of the subscriber, sending an email to the subscriber, reporting theft of a vehicle to a law enforcement agency, and combinations thereof.

13. The method of claim 1, further comprising:
reprogramming a network access device in the telematics unit with an initial mobile identification number/electronic serial number pair after successfully connecting with the call center using the alternative cellular identifier pair.

14. A system for providing wireless connection capability for a telematics unit comprising:
means for determining a connection failure between the telematics unit and a call center;
means for retrieving an alternative cellular identifier pair including an alternative mobile identification number from a memory in the telematics unit based on the determination; and
means for attempting to establish a connection between the telematics unit and the call center using the alternative cellular identifier pair.

15. The system of claim 14, further comprising:
means for determining a connection failure between the telematics unit and the call center using the alternative cellular identifier pair;
means for providing the telematics unit with a revised cellular code including an alternative mobile identification number at the telematics unit based on the determination of a connection failure between the telematics unit and the call center using the alternative cellular identifier pair; and
means for attempting to establish a connection between the telematics unit and the call center using the revised cellular code.

16. The system of claim 14, further comprising:
means for receiving call information at the call center responsive to the attempt to establish a connection between the telematics unit and the call center using a revised cellular code; and
means for determining an action based on the received call information.

17. The system of claim 14, farther comprising: means for reprogramming a network access device in the telematics unit with an initial mobile identification number/electronic serial number pair after successfully connecting with the call center using the alternative cellular identifier pair.

18. A method for providing wireless connection capability for an in-vehicle telematics unit comprising:
determining a connection failure between the telematics unit and a call center;
encoding control channel information with customer specific information, call specific information, and a MIN/LSN pair in response to the determined connection failure, wherein the customer specific information identifies the telematics unit to the call center and the call specific information identifies a reason for contacting the call center; and
attempting to establish a connection between the telematics unit and the call center using the encoded control channel information.

19. The method of claim 18, wherein the encoded control channel information further comprises a location of the vehicle.

20. The method of claim 18, fun her comprising the steps of:
determining a connection failure between the telematics unit and a call center using an original cellular identifier pair;
retrieving an alternative cellular identifier pair from a memory in the telematics unit based on the determination; and
attempting to establish a connection between the telematics unit and the call center using the alternative cellular identifier pair;
wherein the control channel information is encoded in response to the determination of the connection failure using the alternative cellular identifier pair.

* * * * *